(12) United States Patent
Kim (10) Patent No.: US 9,012,063 B2
(45) Date of Patent: Apr. 21, 2015

(54) BATTERY MODULE

(75) Inventor: Myung-Chul Kim, Yongin-si (KR)

(73) Assignees: Samsung SDI Co., Ltd., Yongin-Si, Gyeonggi-Do (KR); Robert Bosch GmbH, Stuttgart (DE)

(*) Notice: Subject to any disclaimer, the term of this patent is extended or adjusted under 35 U.S.C. 154(b) by 879 days.

(21) Appl. No.: 13/137,277

(22) Filed: Aug. 3, 2011

(65) Prior Publication Data

US 2012/0270082 A1     Oct. 25, 2012

(30) Foreign Application Priority Data

Apr. 21, 2011    (KR) ........................ 10-2011-0037306

(51) Int. Cl.
| | |
|---|---|
| H01M 6/42 | (2006.01) |
| H01M 2/10 | (2006.01) |
| H01M 2/00 | (2006.01) |
| H01M 2/12 | (2006.01) |

(52) U.S. Cl.
CPC .......... *H01M 2/1061* (2013.01); *H01M 2/1252* (2013.01)

(58) Field of Classification Search
USPC ......... 429/151, 100, 159, 163, 149, 175, 176, 429/96, 99
See application file for complete search history.

(56) References Cited

U.S. PATENT DOCUMENTS

| | | | |
|---|---|---|---|
| 7,951,482 B2 * | 5/2011 | Ichinose et al. ............... | 429/144 |
| 2006/0251946 A1 | 11/2006 | Makuta et al. | |
| 2010/0136420 A1 | 6/2010 | Shin et al. | |
| 2010/0178548 A1 | 7/2010 | Baek | |

FOREIGN PATENT DOCUMENTS

| | | |
|---|---|---|
| JP | 2006-331805 A | 12/2006 |
| JP | 2007265658 * | 10/2007 |
| JP | 2009-170258 A | 7/2009 |
| JP | 2010-205509 A | 9/2010 |
| KR | 10-2006-0103634 A | 10/2006 |
| KR | 10-2008-0027506 | 3/2008 |
| KR | 10-2010-0064776 A | 6/2010 |
| KR | 10-2010-0083725 | 7/2010 |

OTHER PUBLICATIONS

Korean Office action dated Sep. 10, 2012 for KR 10-2011-0037306 (Myung-Chul Kim).

\* cited by examiner

*Primary Examiner* — Ula C. Ruddock
*Assistant Examiner* — Thomas H. Parsons
(74) *Attorney, Agent, or Firm* — Lee & Morse, P.C.

(57) ABSTRACT

A battery module includes a plurality of battery cells aligned in one direction, first and second end plates, the plurality of battery cells being positioned between the first and second end plates, and a top plate covering top surfaces of the battery cells, the top plate including first and second ends connected to the first and second end plates, respectively, via first and second fastening portions, respectively, the first and second fastening portions being different from each other.

18 Claims, 6 Drawing Sheets

BATTERY MODULE

BACKGROUND

1. Field

Example embodiments relate to a battery module, and more particularly, to a battery module including a plurality of battery cells.

2. Description of the Related Art

A high-power battery module using a non-aqueous electrolyte with high energy density has recently been developed. The high-power battery module is configured as a large-capacity battery module manufactured by connecting a plurality of battery cells in series so as to be used in driving motors of devices requiring high power, e.g., electric vehicles and the like.

SUMMARY

Embodiments are directed to a battery module capable of improving safety by increasing a mechanical strength thereof.

Embodiments are also directed to a battery module capable of reducing production costs by applying a novel material thereto and improving production efficiency by simplifying a manufacturing process thereof.

According to an example embodiment, there may be provided a battery module, including plurality of battery cells aligned in one direction, first and second end plates, the plurality of battery cells being positioned between the first and second end plates, and a top plate covering top surfaces of the battery cells, the top plate including first and second ends connected to the first and second end plates, respectively, via first and second fastening portions, respectively, the first and second fastening portions being different from each other.

The first and second fastening portions may be opposite to each other.

The first fastening portion may include a hanging portion on the first end plate and a mounting portion on the first end of the top plate, the hanging portion and mounting portion overlapping each other.

The first end plate may include a base plate disposed in parallel with the battery cells and at least one flange portion on the base plate and bent away from the battery cells, the hanging portion being bent vertically toward the battery cells from a top of the base plate.

The mounting portion may contact a bottom surface and side surfaces of the hanging portion.

The second fastening portion may include an insertion hole in the second end plate and a hook on the second end of the top plate, the hook being inserted into the insertion hole.

The second fastening member may include at least one first through-hole in the second end plate and a second through-hole in the second end of the top plate, the first and second through-holes being aligned and penetrated by a fastening member.

The fastening member may include a bolt or stud.

The top plate may include plastic, and the first and second plates include stainless steel.

The top plate may include a gas exhaustion path corresponding to vent portions of the battery cells.

The second end of the top plate may include an opening connected to the gas exhaustion path, the opening extending from the gas exhaustion path to be mounted on a stepped portion of the second end plate.

The battery module may further include a connecting member that connects the first and second end plates to each other.

The connecting member may include side plates that respectively support side surfaces of the battery cells, and a bottom plate that supports bottom surfaces of the battery cells.

The top plate may include extending portions at the first and second ends thereof, the extending portion being configured to engage with portions of respective first and second end plates to define the first and second fastening portions, respectively.

The extending portions of the top plate may include a mounting portion protruding from a first end of the top plate toward the first end plate, and an opening protruding from a second end of the top plate toward the second end plate.

The first fastening portion may include overlapping portions of the first end plate and the first end of the top plate, and the second fastening portion may include overlapping portions of the second end plate and the second end of the top plate.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Korean Patent Application No. 10-2011-0037306, filed on Apr. 21, 2011, in the Korean Intellectual Property Office, and entitled: "Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of elements and regions may be exaggerated for clarity of illustration. It will also be understood that when an element is referred to as being "on" another element or substrate, it can be directly on the other element or substrate, or intervening elements may also be present. In addition, it will also be understood that when an element is referred to as being "between" two elements, it can be the only element between the two elements, or one or more intervening elements may also be present. Like reference numerals refer to like elements throughout.

Figure 1:
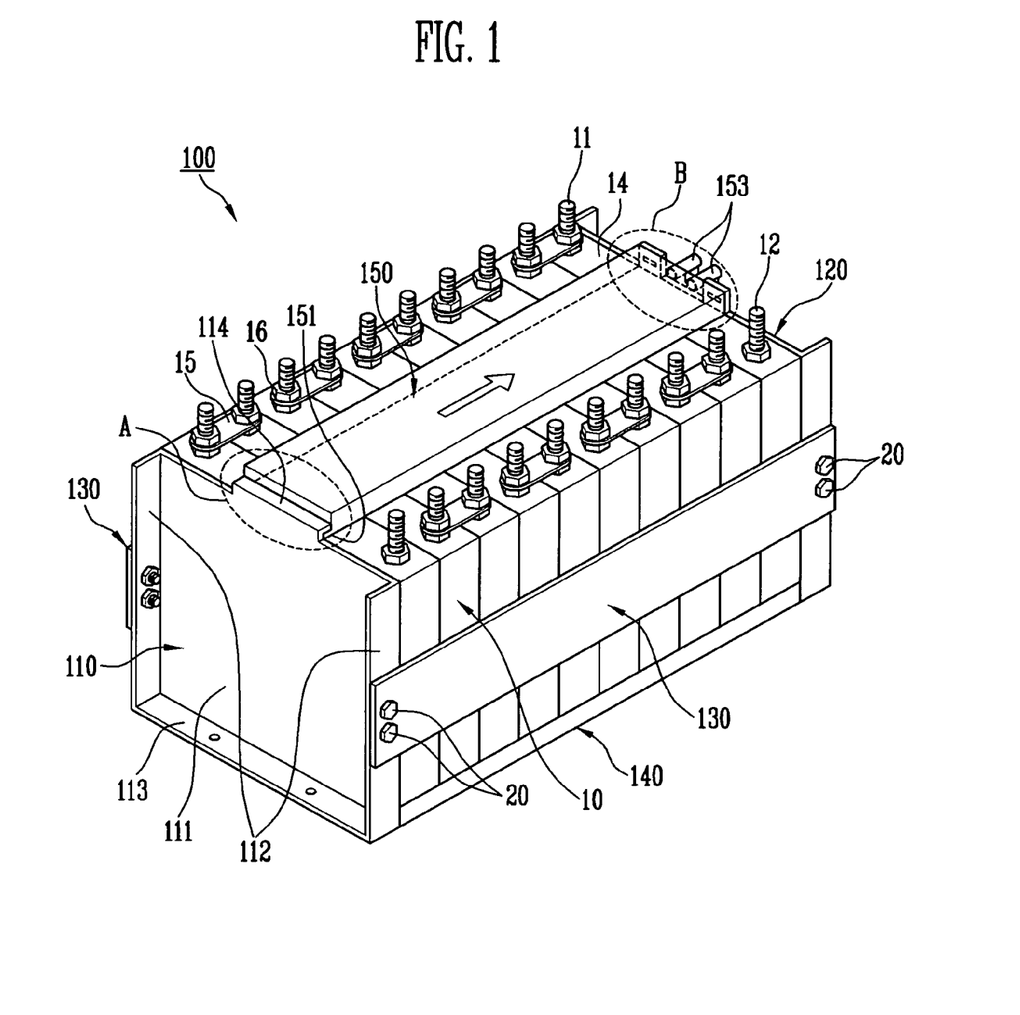
FIG. 1 illustrates a perspective view of a battery module according to an embodiment.

Hereinafter, exemplary embodiments will be described with reference to FIGS. 1-2. FIG. 1 is a perspective view of a battery module according to an embodiment, and FIG. 2 is an exploded perspective view of FIG. 1.

Figure 2:
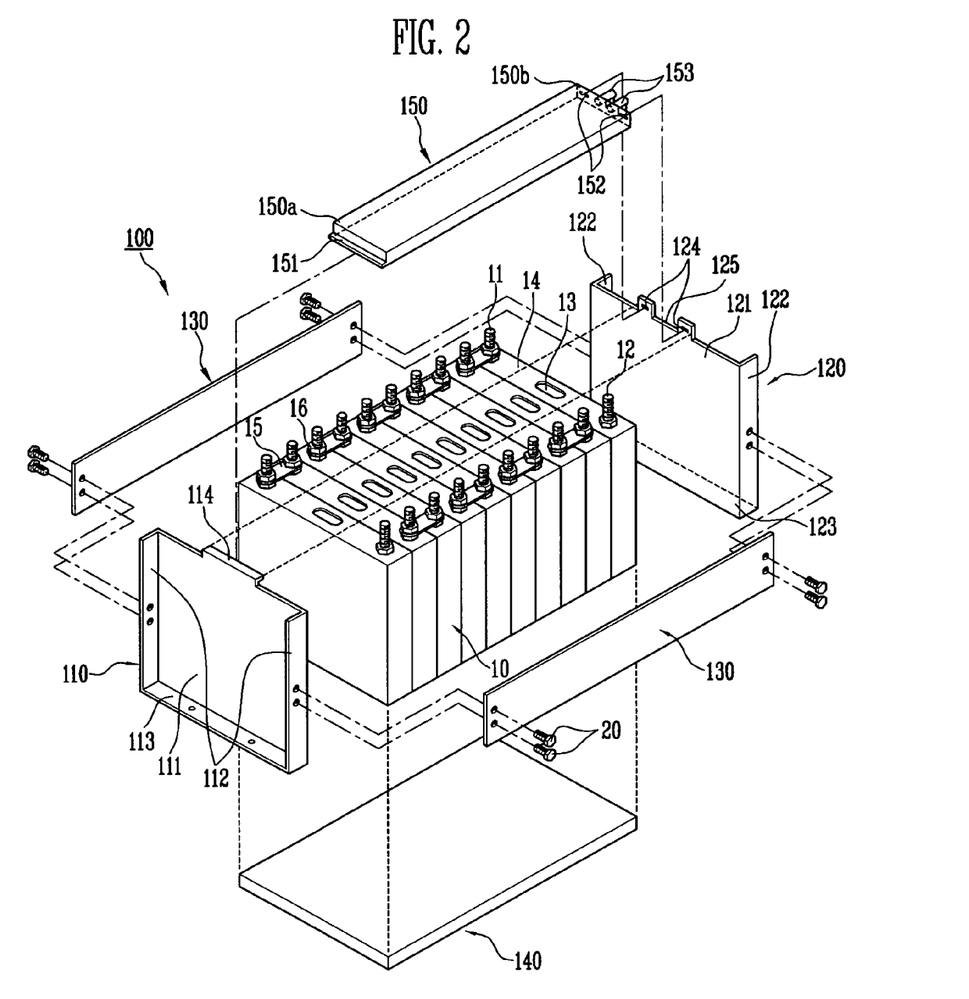
FIG. 2 illustrates an exploded perspective view of FIG. 1.

Referring to FIGS. 1 and 2, the battery module 100 according to this embodiment may include a plurality of battery cells 10 aligned in one direction, first and second end plates 110 and 120 respectively disposed at outsides of the battery cells 10, and a top plate 150 that covers top surfaces of the battery cells 10. One end of the top plate 150 may be fixed to the first end plate 110 so as to provide a first fastening portion A, and the other end of the top plate 150 may be fixed to the second end plate 120 so as to provide a second fastening portion B. The first and second fastening portions A and B are provided in different manners from each other, as will be discussed in more detail below with reference to FIGS. 3A-4B.

The battery cell 10 may be manufactured by accommodating an electrode assembly and an electrolyte in a battery case, followed by sealing the battery case with a cap plate 14. The cap plate 14 may define an upper surface of the battery cell 10. The cap plate 14 may include positive and negative electrode terminals 11 and 12 respectively provided to both ends on the cap plate 14, and a vent portion 13 provided between the terminals 11 and 12. The vent portion 13 serves as a path through which gas generated in the inside of the battery cell 10 is exhausted to the outside of the battery cell 10. The electrode assembly may be composed of a positive electrode plate, a negative electrode plate, and a separator interposed between these electrode plates. The positive electrode plate is connected to the positive electrode terminal 11 provided on the cap plate 14, and the negative electrode plate is connected to the negative electrode terminal 12 provided on the cap plate 14. The electrode assembly composed of the electrode plates generates electric energy through an electrochemical reaction between the electrode assembly and the electrolyte. A plurality of the battery cells 10 may be aligned between the first and second end plates 110 and 120.

The battery module 100 may further include connecting members 130 and 140 that connect the first and second end plates 110 and 120 to each other. For example, the connecting members 130, i.e., side plates 130, may support side surfaces of the battery cells 10, and the connecting member 140, i.e., a bottom plate 140, may support bottom surfaces of the battery cells 10.

The pair of the first and second end plates 110 and 120 and the side and bottom plates 130 and 140 that connect the first and second end plates 110 and 120 to each other may define a space in which the plurality of battery cells 10 may be accommodated. The battery cells 10 may be aligned and fixed in the defined space, thereby forming one battery module. For example, the battery cells 10 may be aligned so that wide surfaces of neighboring battery cells 10 are opposite to each other. The positive and negative electrode terminals 11 and 12 of neighboring battery cells 10 may be electrically connected by a bus-bar 15. The positive and negative electrode terminals 11 and 12 penetrate through holes in the bus-bar 15, and the bus-bar 15 may be fixed by members, such as nuts 16. Thus, the battery cells 10 may be connected in series or parallel.

The battery pack 100 according to this embodiment may further include the top plate 150 in addition to the first and second end plates 110 and 120 and the side and bottom plates 130 and 140. The top plate 150 may be provided to the top surfaces of the battery cells 10, i.e., to overlap the cap plates 14, so as to downwardly fix the battery cells 10. The top plate 150 may be fixed to the first and second end plates 110 and 120 through the first and second fastening portions A and B.

For example, the top plate 150 may be formed of plastic, and the first and second end plates 110 and 120 may be formed of metal, e.g., stainless steel.

The top plate 150 may include a gas exhaustion path provided to correspond to the vent portions 13 of the battery cells 10, e.g., an interior of the top plate 150 may be hollow to define the gas exhaustion path. Therefore, one end of the top plate 150 may be provided with an opening 153 through which the gas exhaustion path is extended to the outside, and an end plate adjacent to the opening 153 may include a portion supporting the opening 153, e.g., the second end plate 120 may include a stepped portion 125 on which the opening 153 is mounted.

When the internal pressure of the battery cell 10 is a predetermined pressure or higher, the vent portion 13 provided to the battery cell 10 may serve as an outlet through which gas generated in the inside of the battery cell 10 is exhausted to the outside of the battery cell 10. That is, the vent portion 13 becomes a primary safety element that prevents the battery cell 10 from being exploded by adjusting the internal pressure of the battery cell 10 as described above. The gas exhausted through the vent portion 13 may pass through the gas exhaustion path of the top plate 150, and may then be exhausted to the outside through the opening 153.

The pressure of the gas exhausted through the vent portion 13 may act in the upper direction. That is, the pressure of the exhausted gas may act as a force directed from an interior of the battery cell 10 toward the cap plate 14, i.e., a force that pushes the top plate 150 upward. As the top plate 150 according to example embodiments is firmly fixed to the first and second end plates 110 and 120 by the first and second fastening portions A and B, it is possible to prevent separation of the top plate 150 from the first and second end plates 110 and 120.

The first and second fastening portions A and B may be provided at opposite ends, i.e., at respective first and second ends 150a and 150b, of the top plate 150. In the top plate 150 formed in an approximately rectangular shape, the first and second ends 150a and 150b of the top plate 150 may be provided at positions opposite to each other, so the first and second fastening portions A and B may effectively distribute the force applied to the top plate 150. Hereinafter, the first fastening portion A provided between the first end 150a of the top plate 150 and the first end plate 110, and the second fastening plate B provided between the second end 150b of the top plate 150 and the second end plate 120 will be described in detail with reference to FIGS. 3A-4B.

Figure 3A:
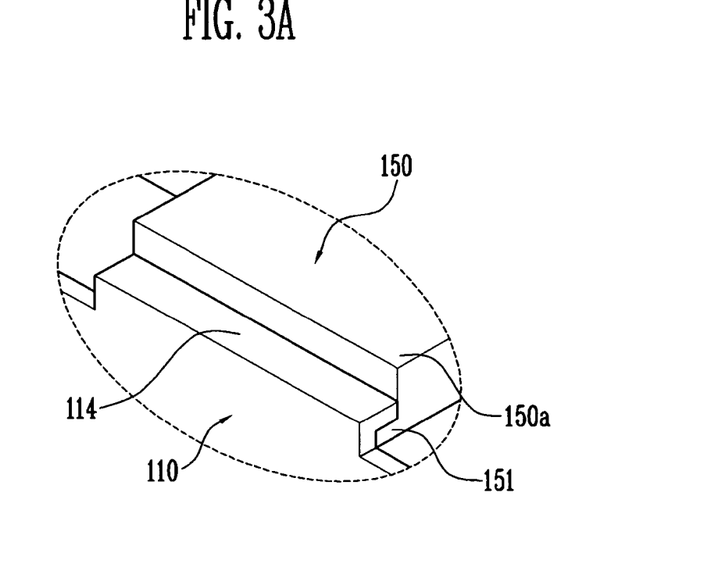
FIG. 3A illustrates an enlarged view of portion A of FIG. 1.
Figure 3B:
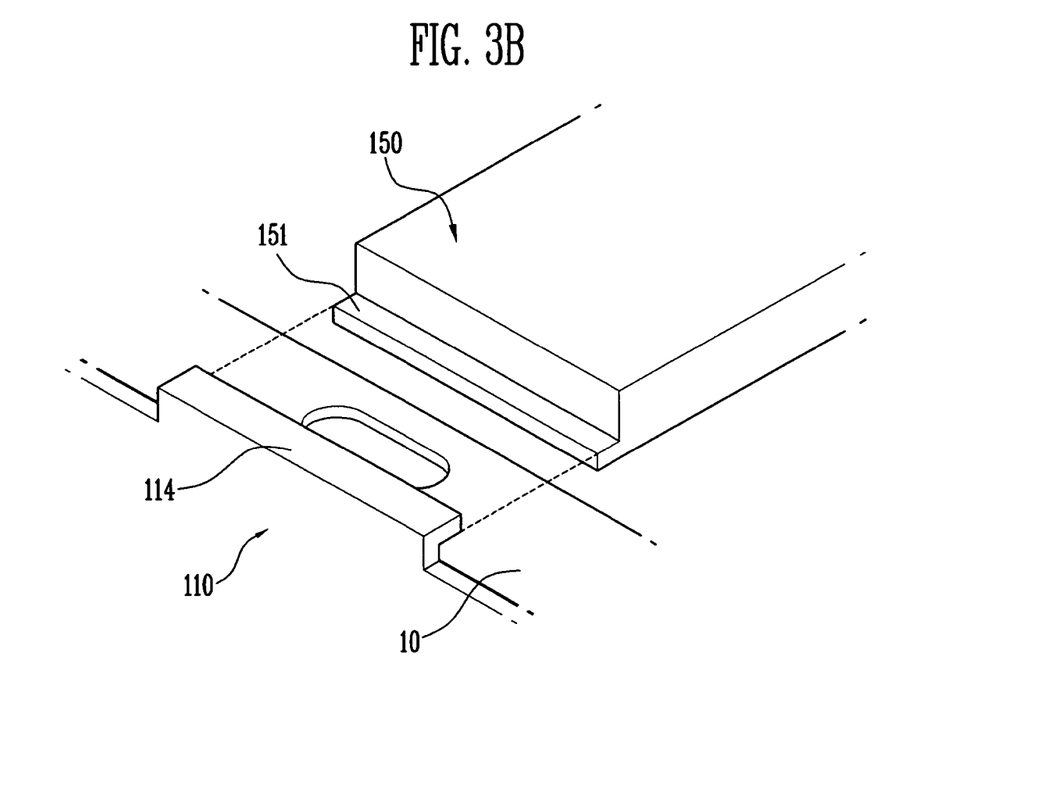
FIG. 3B illustrates an exploded perspective view of FIG. 3A.

FIG. 3A is an enlarged view of portion A of FIG. 1. FIG. 3B is an exploded perspective view of FIG. 3A.

Referring to FIGS. 3A-3B, the first fastening portion A (FIG. 1) may be provided between the first end 150a of the top plate 150 and the first end plate 110. The first fastening portion A may include a hanging portion 114 on the first end plate 110, and a mounting portion 151 on the first end 150a of the top plate 150 so as to be overlapped with the hanging portion 114. The mounting portion 151 may extend, e.g., horizontally, from a bottom of the top plate 150 toward the first end plate 110.

In detail, referring to FIGS. 1-2, the first end plate 110 may include a base plate 111 disposed in parallel with the battery cells 10, and at least one of flange portions 112 and 113. The flange portions 112 and 113 may be attached to the base plate 111 and bent in the opposite direction to the battery cells 10 from the side and bottom portions, respectively, of the base plate 111. As illustrated in FIG. 2, the hanging portion 114 may be attached to a top of the base plate 111, and may be vertically bent toward the battery cells 10. As illustrated in FIG. 1, the hanging portion 114 may protrude above the battery cells 10, so the mounting portion 151 may fit between the hanging portion 114 and the battery cell 10, e.g., the mounting portion 151 and hanging portion 114 may completely overlap each other. In other words, as illustrated in FIG. 3A, the mounting portion 151 may contact the hanging portion 114.

In the first end plate 110, the base plate 111 faces a wide surface of the battery cell 10, and the flange portions 112, 113 are bent in the opposite direction to the battery cell 10. The flange portion 112 or 113 may be fastened to the side or bottom plates 130 or 140 using a separate member 20, as illustrated in FIG. 1.

The hanging portion 114 may be provided at the top of the first end plate 110. The hanging portion 114 may be bent in the direction of the battery cells 10, i.e., toward the battery cells 10, so as to face, e.g., overlap, the cap plate 14 of the battery cell 10. The hanging portion 114 may be spaced apart from the cap plate 14 at a predetermined interval, so that a predetermined space may be provided between the hanging portion 114 and the cap plate 14. The mounting portion 151 of the top plate 150 may be inserted into the space provided as described above. That is, the first fastening portion A may be provided so that the mounting portion 151 and the hanging portion 114 are sequentially provided on the battery cell 10. The first fastening portion A does not require a separate member for fixing the top plate 150 to the first end plate 110. That is, the first fastening portion A may stably fix the first end 150a of the top plate 150 using the bent hanging portion 114 at the top of the first end plate 110.

Figure 4A:
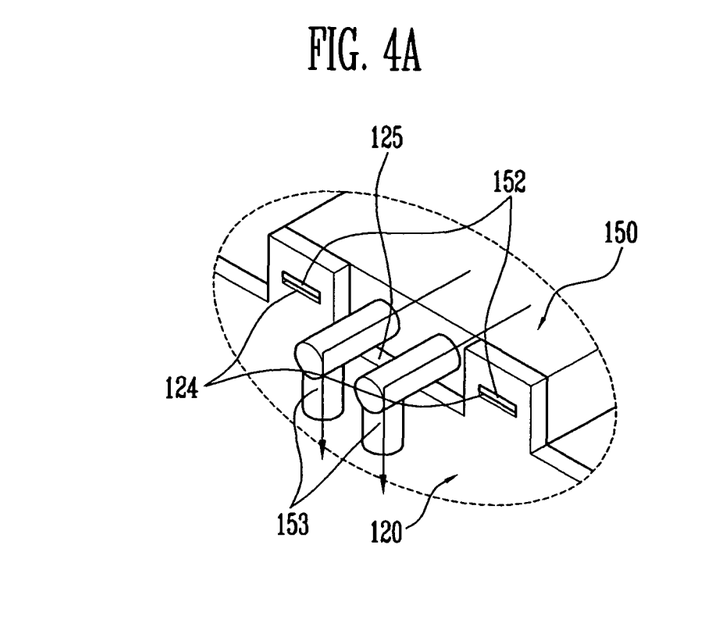
FIG. 4A illustrates an enlarged view of portion B of FIG. 1.
Figure 4B:
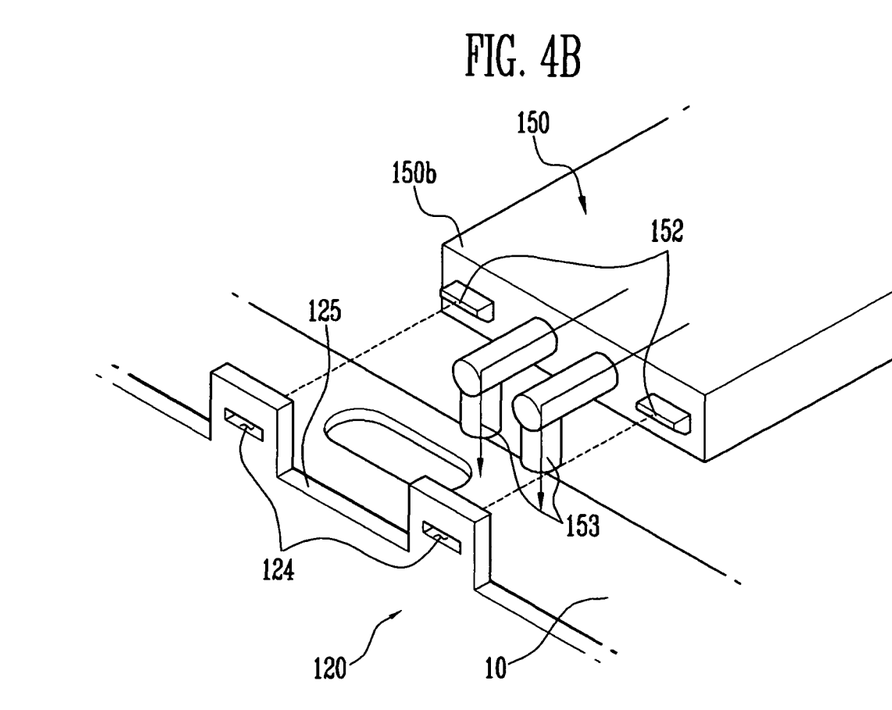
FIG. 4B illustrates an exploded perspective view of FIG. 4A.

FIG. 4A is an enlarged view of portion B of FIG. 1. FIG. 4B is an exploded perspective view of FIG. 4A.

Referring to FIGS. 4A and 4B, the second fastening portion B (see FIG. 1) may be provided between the second end 150b of the top plate 150 and the second end plate 120. The second fastening portion B may include at least one insertion hole 124 provided to the second end plate 120, and a hook 152 provided to the second end 150b of the top plate 150 so as to be fastened to the insertion hole 124.

The pair of the first and second end plates 110 and 120 may be provided in parallel with the plurality of battery cells 10 interposed therebetween. The second end plate 120 may include a base plate 121 that faces the battery cell 10, and one or more flange portions 122 and 123 bent in the opposite direction to the battery cell 10 from at least one of both side portions and a bottom portion of the base plate 121. The flange portion 122 or 123 may be fastened to the side or bottom plate 130 or 140 using a separate fastening member such as a bolt.

The top plate 150 may be provided with the second fastening portion including, for example, a hook coupling between the other end of the top plate 150 and the second end plate 120. The at least one insertion hole 124 may be provided to the second end plate 120, and the hook fastened to the insertion hole 124 may be provided to the top plate 150. The hook 152 provided to the top plate 150 is inserted into the insertion hole 124 of the second end plate 120, so that the top plate 150 can be firmly fixed to the second end plate 120.

The second end plate 120 may further include a stepped portion 125. The stepped portion 125 may have a lower step different than its surroundings at the top of the second end plate 120. That is, as illustrated in FIGS. 2 and 4B, the stepped portion 125 may be lower than a portion including the insertion hole 124, so the stepped portion 125 may have a step structure relative to the portion including the insertion hole 124, e.g., the stepped portion 125 may be a lower step between two portions including the insertion holes 124. The opening 153 of the top plate 150 may be hook-shaped, and may be mounted on the stepped portion 125.

In detail, the opening 153 may have a first portion connected approximately in parallel with the gas exhaustion path of the top plate 150 and extending from the second end 150b of the top plate 150, and a second portion extending from the first portion to face the battery cell 10. That is, the opening 153 may have an inverted L-shape, so the second portion of the opening 153 may extend perpendicularly to the top plate 150 and to the first portion. As illustrated in FIG. 4A, the first portion of the opening 153 may extend over the stepped portion 125, so the second portion of the opening 153 may extend vertically along the second end plate 120, i.e., to be hooked against the second end plate 120. In other words, the stepped portion 125 of the second end plate 120 may be oriented between the opening 153 and the second end 150b of the top plate 150. The stepped portion 125 may have a shape corresponding to the opening 153 of the top plate 150 so as to provide a space in which the opening 153 is mounted. When the opening 153 is positioned over the stepped portion 125, the at least one hook 152 at the second end 150b of the top plate 150 is fastened to the insertion hole 124. Accordingly, it may be possible to improve the fastening force of the second fastening portion B of the top plate 150.

As described above, the first and second fastening portions A and B that respectively fix the first and second ends 150a and 150b of the top plate 150 to the first and second end plate 110 and 120 may be provided in different manners, and do not require a separate member such as a bolt. That is, on the top surfaces of the plurality of battery cells 10 fixed by the first and second end plates 110 and 120 and the side and bottom plates 130 and 140, the mounting portion 151 provided to the first end 150a of the top plate 150 is inserted into the space between the hanging portion 114 of the first end plate 110 and the battery cell 10, and the hook 152 provided to the second end 150b of the top plate 150 is inserted into the insertion hole 124 of the second end plate 120, so that the top plate 150 may be stably fixed to the first and second end plates 110 and 120. In the battery module 100 configured as described above, material cost may be reduced, and the manufacturing process may be simplified, thereby improving production efficiency.

Hereinafter, other embodiments will be described with respect to FIGS. 5A to 6B. In FIGS. 5A to 6B, contents except the following description are identical to those described in FIGS. 1 to 4B, and therefore, their detailed descriptions will be omitted.

Figure 5A:
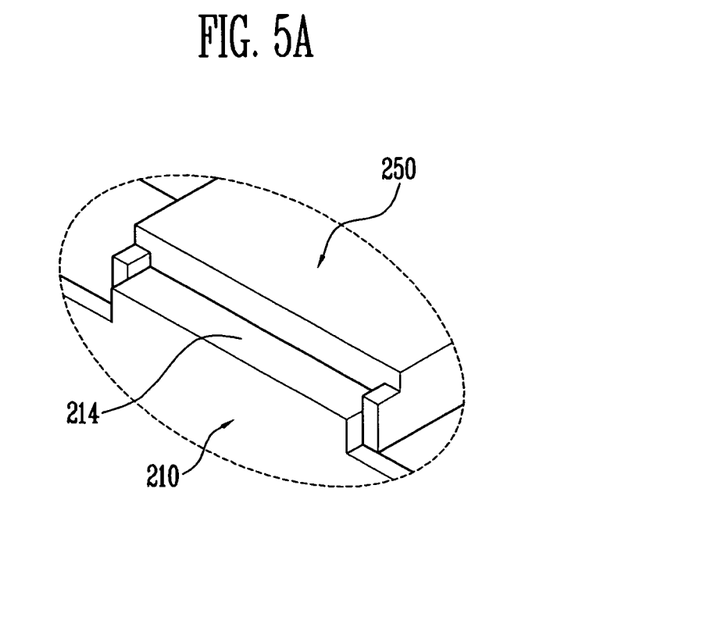
FIG. 5A illustrates a perspective view of a first fastening portion according to another embodiment.
Figure 5B:
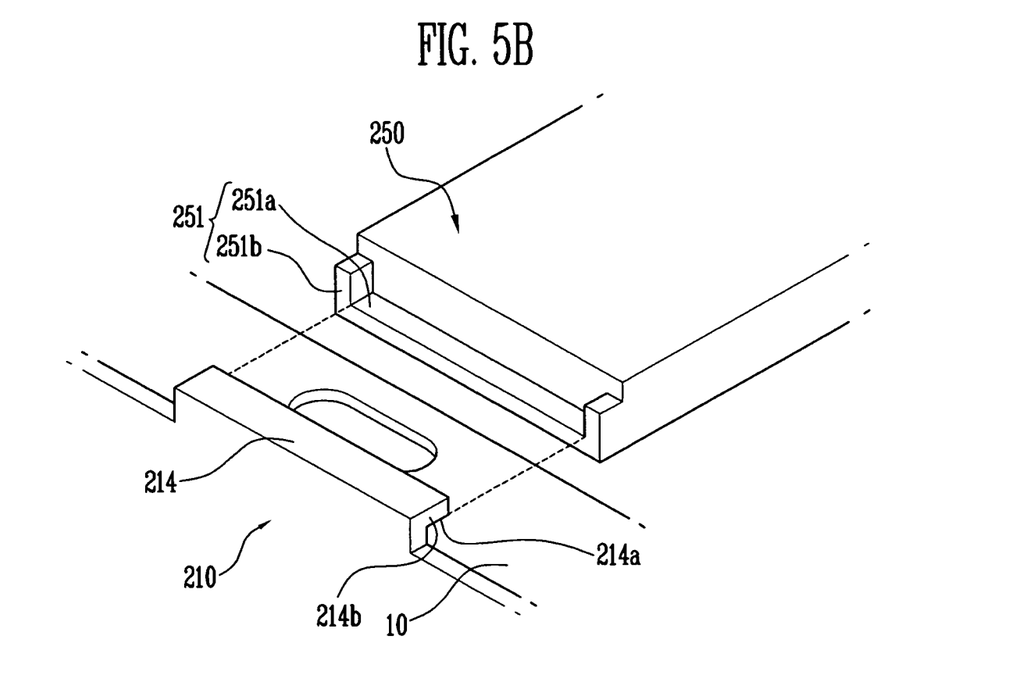
FIG. 5B illustrates an exploded perspective view of FIG. 5A.

FIG. 5A is a perspective view of a first fastening portion according to another embodiment. FIG. 5B is an exploded perspective view of FIG. 5A.

Referring to FIGS. 5A and 5B, a battery module according to this embodiment may include a plurality of battery cells 10 aligned in one direction, a first end plate 210, a second end plate, and a top plate 250, which fix the battery cells 10. One end of the top plate 250 may be fixed to the first end plate 210 so as to provide a first fastening portion, and the other end of the top plate 250 may be fixed to the second plate so as to provide a second fastening portion. The first and second fastening portions may be provided in different manners.

The first fastening portion may include a hanging portion 214 and a mounting portion 251 provided to correspond to the hanging portion 214. The hanging portion 214 may be provided to the first end plate 210, and may be bent to be overlapped with the top plate 250 at a top of the first end plate 210. The mounting portion 251 may be provided to correspond to the hanging portion 214 at the one end of the top plate 250.

The mounting portion 251 may be provided to come in contact with a bottom surface 214a and both side surfaces 214b of the hanging portion 214. The mounting portion 251 has an opened top surface, and may be composed of a bottom surface 251a and sidewalls 251b respectively provided to be extended from both sides of the bottom surface 251a. The space defined by the bottom surface 251a and sidewalls 251b of the mounting portion 251 may be provided to correspond to the hanging portion 214. Thus, the sidewalls 251b of the mounting portion 251 may contact the side surfaces 214b of the hanging portion 214 and may prevent left and right movements of the hanging portion 214 mounted on the bottom surface 251a of the mounting portion 251, thereby improving the fastening force of the first fastening portion.

Figure 6A:
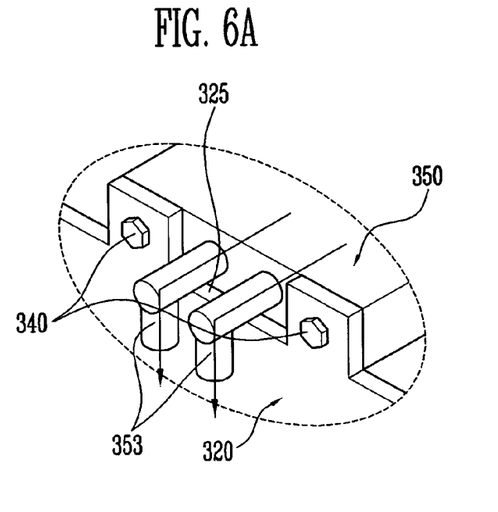
FIG. 6A illustrates a perspective view of a second fastening portion according to another embodiment.
Figure 6B:
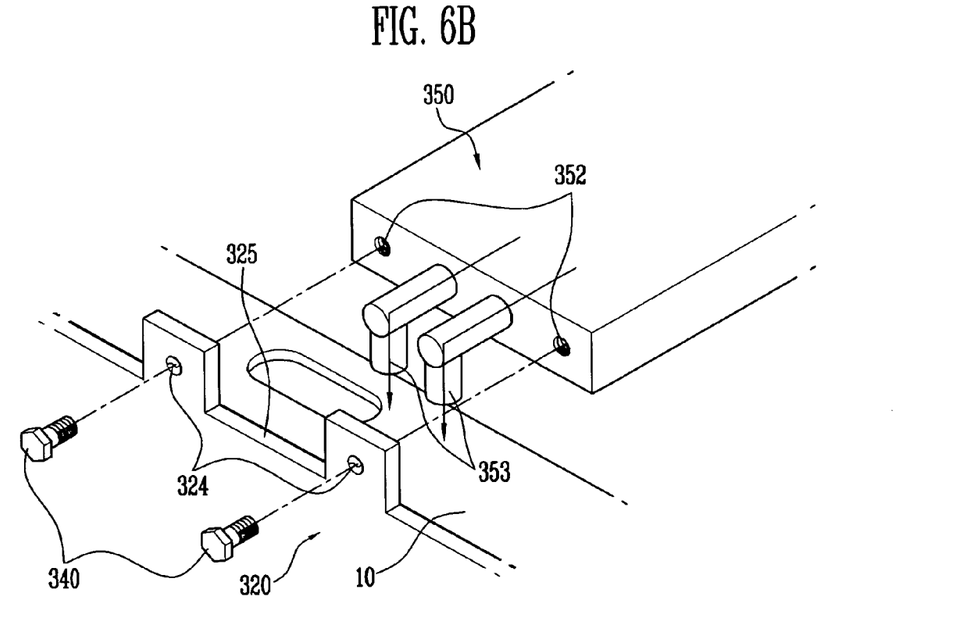
FIG. 6B illustrates an exploded perspective view of FIG. 6A.

FIG. 6A is a perspective view of a second fastening portion according to another embodiment. FIG. 6B is an exploded perspective view of FIG. 6A.

Referring to FIGS. 6A and 6B, a battery module according to this embodiment may include a plurality of battery cells aligned in one direction, a first end plate, a second end plate 320, and a top plate 350. One end of the top plate 350 may be fixed to the first end plate so as to provide a first fastening portion, and the other end of the top plate 350 may be fixed to the second end plate 320 so as to provide a second fastening portion. The first and second fastening portions may be provided in different manners.

The second fastening portion may include a first through-hole 324 and a second through-hole 352. The first through-hole 324 may be provided to the second end plate 320, and the second through-hole 352 may be provided to the other end of the top plate 350. The first and second through-holes 324 and 325 may be provided to correspond to each other, e.g., to be aligned.

When the one end of the top plate 350 is fixed to the first end plate 310 and the other end of the top plate 350 is then fixed to the second end plate 320, the first and second through-holes 324 and 352 may be extended to each other so as to form one path, and the path may be penetrated by a fastening member 30. For example, the fastening member 30 may include a bolt or stud.

As described above, according to embodiments, a battery module may include an improved fastening mechanism of a top plate to end plates of the battery module, so separation of the top plate from the battery module may be prevented. As such, the battery module may have improved safety, reduced production costs, and improved production efficiency. In addition, as battery modules may be generally used as power sources of electronic devices, the battery module according to example embodiments may provide a plurality of stably fixed battery cells that have a small size and light weight.

In contrast, as battery modules may be modified to be used in various fields, in a conventional battery module, i.e., a battery module without the fastening mechanism according to example embodiments, the top plate may be removed when pressure increases in the battery cells. As such, when the exposed battery cells are moved by an external impact or the like, the electrical connection of the battery module may be disconnected or safety of the battery module may substantially decrease.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery module, comprising:
    a plurality of battery cells aligned in one direction;
    first and second end plates, the plurality of battery cells being positioned between the first and second end plates; and
    a top plate covering top surfaces of the battery cells, the top plate including first and second ends connected to the first and second end plates, respectively, via first and second fastening portions, respectively, the first and second fastening portions being different from each other;
    wherein the first fastening portion includes a hanging portion on the first end plate and a mounting portion on the first end of the top plate, the hanging portion and mounting portion overlapping each other; and
    wherein the mounting portion contacts a bottom surface of the hanging portion.

2. The battery module as claimed in claim 1, wherein the first and second fastening portions are opposite to each other.

3. The battery module as claimed in claim 1, wherein the first end plate includes a base plate disposed in parallel with the battery cells and at least one flange portion on the base plate and bent away from the battery cells, the hanging portion being bent vertically toward the battery cells from a top of the base plate.

4. The battery module as claimed in claim 1, wherein the mounting portion contacts side surfaces of the hanging portion.

5. The battery module as claimed in claim 1, wherein the top plate includes plastic, and the first and second plates include stainless steel.

6. The battery module as claimed in claim 1, wherein the top plate includes a gas exhaustion path corresponding to vent portions of the battery cells.

7. The battery module as claimed in claim 6, wherein the second end of the top plate includes an opening connected to the gas exhaustion path, the opening extending from the gas exhaustion path to be mounted on a stepped portion of the second end plate.

8. The battery module as claimed in claim 1, further comprising a connecting member that connects the first and second end plates to each other.

9. The battery module as claimed in claim 8, wherein the connecting member includes side plates that respectively support side surfaces of the battery cells, and a bottom plate that supports bottom surfaces of the battery cells.

10. The battery module as claimed in claim 1, wherein the top plate includes extending portions at the first and second ends thereof, the extending portions being configured to engage with portions of respective first and second end plates to define the first and second fastening portions, respectively.

11. The battery module as claimed in claim 10, wherein the extending portions of the top plate include a mounting portion protruding from a first end of the top plate toward the first end plate, and an opening protruding from a second end of the top plate toward the second end plate.

12. The battery module as claimed in claim 1, wherein the second fastening portion includes overlapping portions of the second end plate and the second end of the top plate.

13. The battery module as claimed in claim 1, wherein the second fastening portion includes an insertion hole in the second end plate and a hook on the second end of the top plate, the hook being inserted into the insertion hole.

14. The battery module as claimed in claim 1, wherein the second fastening portion includes at least one first through-hole in the second end plate and a second through-hole in the second end of the top plate, the first and second through-holes being aligned and penetrated by a fastening member.

15. A battery module, comprising:
   a plurality of battery cells aligned in one direction;
   first and second end plates, the plurality of battery cells being positioned between the first and second end plates; and
   a top plate covering top surfaces of the battery cells, the top plate including first and second ends connected to the first and second end plates, respectively, via first and second fastening portions, respectively, the first and second fastening portions being different from each other;
   wherein the second fastening portion includes an insertion hole in the second end plate and a hook on the second end of the top plate, the hook being inserted into the insertion hole.

16. The battery module as claimed in claim 15, wherein the first fastening portion includes a hanging portion on the first end plate and a mounting portion on the first end of the top plate, the hanging portion and mounting portion overlapping each other.

17. The battery module as claimed in claim 16, wherein the second fastening portion includes at least one first through-hole in the second end plate and a second through-hole in the second end of the top plate, the first and second through-holes being aligned and penetrated by a fastening member.

18. The battery module as claimed in claim 17, wherein the fastening member includes a bolt or stud.

* * * * *